(12) United States Patent
Du et al.

(10) Patent No.: US 9,948,864 B2
(45) Date of Patent: Apr. 17, 2018

(54) PHOTOGRAPHY ILLUMINATION COMPENSATION METHOD, COMPENSATION APPARATUS, AND USER EQUIPMENT

(71) Applicant: Beijing Zhigu Rui Tuo Tech Co., Ltd, Beijing (CN)

(72) Inventors: Lin Du, Beijing (CN); Zhengxiang Wang, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/515,561

(22) PCT Filed: Jul. 24, 2015

(86) PCT No.: PCT/CN2015/085028
§ 371 (c)(1),
(2) Date: Mar. 29, 2017

(87) PCT Pub. No.: WO2016/050115
PCT Pub. Date: Apr. 7, 2016

(65) Prior Publication Data
US 2017/0230584 A1 Aug. 10, 2017

(30) Foreign Application Priority Data

Sep. 30, 2014 (CN) .......................... 2014 1 0520633

(51) Int. Cl.
*H04N 5/232* (2006.01)
*H04N 5/235* (2006.01)
*G03B 15/05* (2006.01)

(52) U.S. Cl.
CPC ......... *H04N 5/23293* (2013.01); *G03B 15/05* (2013.01); *H04N 5/2352* (2013.01);
(Continued)

(58) Field of Classification Search
CPC ............. H04N 5/23293; H04N 5/2352; H04N 5/2354; G03B 15/05
(Continued)

(56) References Cited

U.S. PATENT DOCUMENTS 7,245,317 B2  7/2007  Sugiyama et al.
8,218,963 B2  7/2012  Adelsberger et al.
(Continued)

FOREIGN PATENT DOCUMENTS

CA    2759721 A    6/2012
CN    1350633 A    5/2002
(Continued)

OTHER PUBLICATIONS

International Search Report for PCT Application No. PCT/CN2015/085028, dated Nov. 3, 2015, 3 pages.

*Primary Examiner* — Clayton E Laballe
*Assistant Examiner* — Linda B Smith
(74) *Attorney, Agent, or Firm* — Amin, Turocy & Watson, LLP

(57) ABSTRACT

A photography illumination compensation method comprises: obtaining a surface shape characteristic of a photographed side of an object in a photographing field of view; obtaining first relative direction information of the object relative to a photography position related to the photographing field of view, obtaining second relative direction information of the object relative to an illumination array comprising multiple illumination units, and adjusting, according to the surface reflection characteristic, the first relative direction information, the second relative direction information, and a set illumination compensation criterion, an illumination parameter of an illumination unit in the illumination array. An illumination parameter of an illumination unit in the illumination array is determined by referring to a
(Continued)

surface shape characteristic of the photographed object in the photographing field of view, to perform better illumination compensation for the photographed object in the photographing field of view to enable a required illumination compensation effect.

27 Claims, 9 Drawing Sheets

(52) U.S. Cl.
CPC ....... *H04N 5/2354* (2013.01); *H04N 5/23296* (2013.01); *G03B 2215/00* (2013.01)

(58) Field of Classification Search
USPC .......................................................... 396/232
See application file for complete search history.

(56) References Cited

U.S. PATENT DOCUMENTS

| | | | |
|---|---|---|---|
| 8,243,187 B2 | 8/2012 | Tanaka et al. | |
| 8,446,521 B2 | 5/2013 | Whillock | |
| 9,033,522 B2 | 5/2015 | Ley et al. | |
| 9,407,837 B2 | 8/2016 | Lee | |
| 2003/0179385 A1* | 9/2003 | Fujiwara | G01B 11/254 356/605 |
| 2004/0234122 A1* | 11/2004 | Kochi | G01B 11/24 382/154 |
| 2005/0088543 A1 | 4/2005 | Yoshii | |
| 2011/0123183 A1 | 5/2011 | Adelsberger et al. | |
| 2014/0132722 A1 | 5/2014 | Martinez et al. | |
| 2014/0240492 A1 | 8/2014 | Lee | |

FOREIGN PATENT DOCUMENTS

| | | |
|---|---|---|
| CN | 1605189 A | 4/2005 |
| CN | 101329491 A | 12/2008 |
| CN | 102150079 A | 8/2011 |
| CN | 102494609 A | 6/2012 |
| CN | 202421694 U | 9/2012 |
| CN | 103714321 A | 4/2014 |
| CN | 203574745 U | 4/2014 |
| CN | 104243843 A | 12/2014 |
| JP | 2001027510 A | 1/2001 |
| WO | 0010303 A1 | 11/2000 |
| WO | 2016050115 A1 | 4/2016 |

* cited by examiner

PHOTOGRAPHY ILLUMINATION COMPENSATION METHOD, COMPENSATION APPARATUS, AND USER EQUIPMENT

RELATED APPLICATION

The present application is a U.S. National Stage filing under 35 U.S.C. § 371 of international patent cooperation treaty (PCT) application No. PCT/CN2015/085028, filed Jul. 24, 2015, and entitled "PHOTOGRAPHY ILLUMINATION COMPENSATION METHOD, COMPENSATION APPARATUS, AND USER EQUIPMENT", which claims the benefit of priority to Chinese Patent Application No. 201410520633.5, filed on Sep. 30, 2014, which applications are hereby incorporated into the present application by reference herein in their respective entireties.

TECHNICAL FIELD

The present application relates to the field of image acquisition technologies, and in particular, to an illumination compensation technology in photography.

BACKGROUND

Under a condition where ambient illumination is poor, in particular, on an evening, photography of a picture or a video requires using of an illumination apparatus (for example, a flashlight, a scene light, and the like) to perform light compensation for a photography scene, during the photography, light rays emitted from the illumination apparatus are used to illuminate the scene to achieve a better photography effect. Some illumination apparatuses may be directly mounted on an image acquisition device such as a camera, for example, a mobile phone and a domestic camera would usually have a built-in flash module; further, some more professional image acquisition devices may use an external illumination apparatus to perform better light compensation for a scene.

SUMMARY

An example, non-limiting objective of embodiments of the present application is providing a photography illumination compensation solution.

In a first aspect, an example embodiment of the present application provides a photography illumination compensation method, comprising:
  obtaining at least one surface reflection characteristic of a photographed side of an object in a photographing field of view, wherein the at least one surface reflection characteristic comprises a surface shape characteristic;
  obtaining first relative direction information of the object relative to a photography position related to the photographing field of view;
  obtaining second relative direction information of the object relative to an illumination array, wherein the illumination array comprises multiple illumination units, configured to perform illumination compensation for the photographed side; and
  adjusting, at least according to the at least one surface reflection characteristic, the first relative direction information, the second relative direction information, and at least one set illumination compensation criterion, at least one illumination parameter of at least one illumination unit in the illumination array.

In a second aspect, an example embodiment of the present application provides a photography illumination compensation apparatus, comprising:
  a surface characteristic obtaining module, configured to obtain at least one surface reflection characteristic of a photographed side of an object in a photographing field of view, wherein the at least one surface reflection characteristic comprises a surface shape characteristic;
  a first direction obtaining module, configured to obtain first relative direction information of the object relative to a photography position related to the photographing field of view;
  a second direction obtaining module, configured to obtain second relative direction information of the object relative to an illumination array, wherein the illumination array comprises multiple illumination units, configured to perform illumination compensation for the photographed side; and
  an illumination parameter adjusting module, configured to adjust, at least according to the at least one surface reflection characteristic, the first relative direction information, the second relative direction information, and at least one set illumination compensation criterion, at least one illumination parameter of at least one illumination unit in the illumination array.

In a third aspect, an example embodiment of the present application provides a user equipment, comprising the foregoing photography illumination compensation apparatus.

In a fourth aspect, an example embodiment of the present application provides a computer readable storage device comprising executable instructions that, in response to execution, cause a device comprising a processor to perform operations, comprising:
  obtaining at least one surface reflection characteristic of a photographed side of an object in a photographing field of view, wherein the at least one surface reflection characteristic comprises a surface shape characteristic;
  obtaining first relative direction information of the object relative to a photography position related to the photographing field of view;
  obtaining second relative direction information of the object relative to an illumination array, wherein the illumination array comprises multiple illumination units, configured to perform illumination compensation for the photographed side; and
  adjusting, at least according to the at least one surface reflection characteristic, the first relative direction information, the second relative direction information, and at least one set illumination compensation criterion, at least one illumination parameter of at least one illumination unit in the illumination array.

In at least one example embodiment of the present application, when an illumination array comprising multiple illumination units performs illumination compensation for a photographed object in a photographing field of view, at least one illumination parameter of at least one illumination unit in the illumination array is determined by referring to a surface shape characteristic of the photographed object in the photographing field of view, so as to perform better illumination compensation for the photographed object in the photographing field of view to cause that an obtained image achieves a required illumination compensation effect.

DETAILED DESCRIPTION

Figure 1:
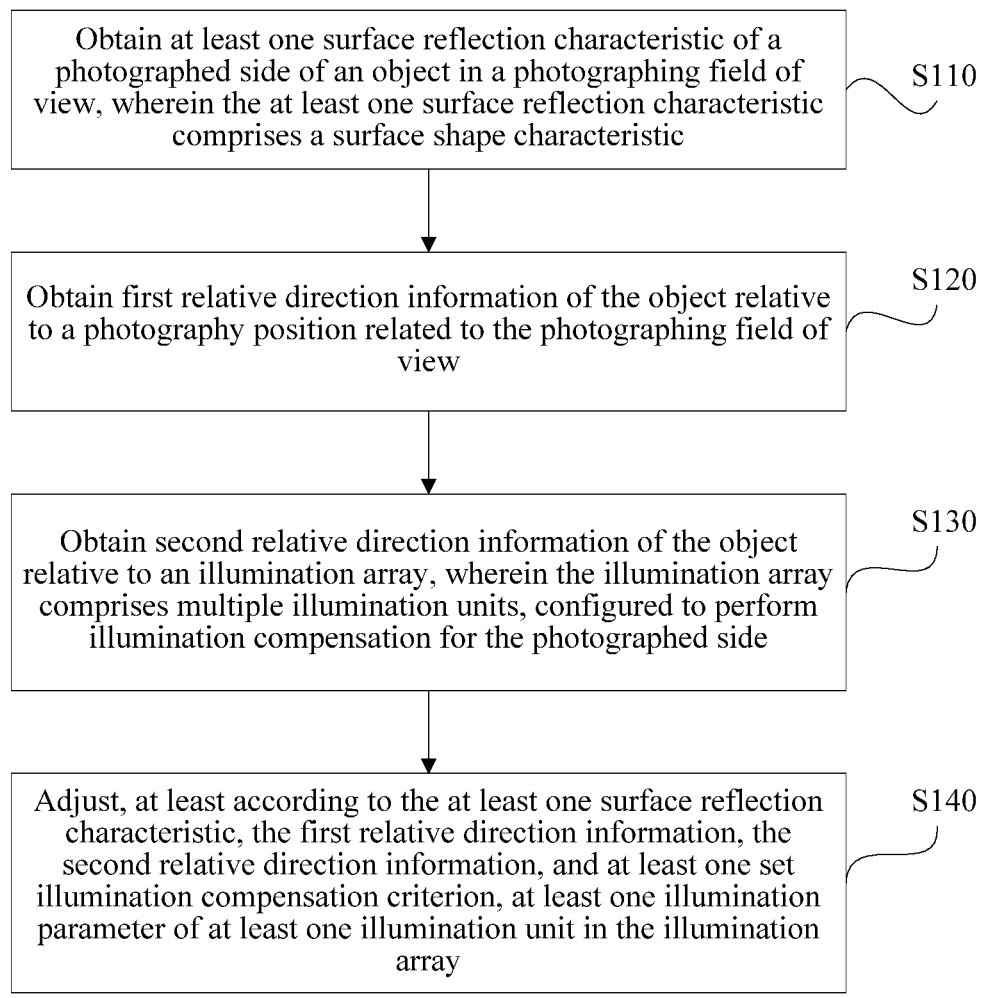
FIG. 1 is a flowchart of a photography illumination compensation method according to an example embodiment of the present application.

Example embodiments of the present application are further described in detail below with reference to the accompanying drawings (in which like elements are denoted by like reference numerals) and embodiments. The following embodiments are intended to describe the present application, but not to limit the scope of the present application.

It should be understood by persons skilled in the art that terms, such as "first" and "second", in the present application are merely used for distinguishing different steps, devices, modules, or the like, neither represent any specific technical meaning, nor represent a necessary logical sequence among them.

It is noted that when light compensation, such as flash, and photography is performed on an object in an environment where an ambient light condition is poor, because different surface shapes of a photographed side of the object may cause different reflection directions of the light compensation, some parts of the photographed side of the object may be subject to light overcompensation or light undercompensation, thereby affecting a photography effect of the object.

Therefore, as shown in FIG. 1, an embodiment of the present application provides a photography illumination compensation method, comprising:

S110. Obtain at least one surface reflection characteristic of a photographed side of an object in a photographing field of view, wherein the at least one surface reflection characteristic comprises a surface shape characteristic.

S120. Obtain first relative direction information of the object relative to a photography position related to the photographing field of view.

S130. Obtain second relative direction information of the object relative to an illumination array, wherein the illumination array comprises multiple illumination units, configured to perform illumination compensation for the photographed side.

S140. Adjust, at least according to the at least one surface reflection characteristic, the first relative direction information, the second relative direction information, and at least one set illumination compensation criterion, at least one illumination parameter of at least one illumination unit in the illumination array.

For example, a photography illumination compensation apparatus according to the present application serves as an execution body to perform S110 to S140. In particular, the photography illumination compensation apparatus may be arranged in a user equipment in a manner of software, hardware, a combination of software and hardware, or the photography illumination compensation apparatus per se is the user equipment; the user equipment comprises, but is not limited to, a camera, a video camera, a smart phone, a tablet computer, smart glasses, or the like having a photographing or video recording function.

In example embodiments of the present application, when an illumination array comprising multiple illumination units performs illumination compensation for a photographed object in a photographing field of view, at least one illumination parameter of at least one illumination unit in the illumination array is determined by referring to a surface shape characteristic of the photographed object in the photographing field of view, so as to perform better illumination compensation for the photographed object in the photographing field of view to cause that an obtained image achieves a required illumination compensation effect.

Respective steps of the embodiment of the present application are further described by using the implementations below.

S110. Obtain at least one surface reflection characteristic of a photographed side of an object in a photographing field of view, wherein the at least one surface reflection characteristic comprises a surface shape characteristic.

In the embodiment of the present application, the surface shape characteristic of the photographed side of the object, on one hand, affects a normal line direction of each point on a surface of the photographed side, and on the other hand, also affects relative distances from the each point to the photography position and the illumination array. Wherein, when compared with the relative distances from the photographed side of the object to the photography position and the illumination array, distance differences between each point to the photography position and each point to the illumination array caused by the surface shape characteristic of the photographed side can be neglected, the surface shape characteristic can be considered to only affect the normal line direction.

In an example embodiment, the surface shape characteristic may be obtained by:

obtaining a depth map of the photographed side of the object; and analyzing the depth map to obtain the surface shape characteristic of the photographed side of the object.

Because the depth map comprises information of a distance from each point of the photographed side of the object to an obtaining position of the depth map, the surface shape characteristic can be obtained by analyzing the depth map.

In another example embodiment, the surface shape characteristic may be obtained by:

obtaining an image corresponding to the photographing field of view; and analyzing the image to obtain the surface shape characteristic of the photographed side of the object.

With regard to some objects having a regular surface, for example, an object having a spherical surface, an object having a rectangular surface, and the like, an image characteristic of the object may be obtained by analyzing the image, so as to obtain the surface shape characteristic of the photographed side of the object.

Persons skilled in the art can certainly know that other method(s) for obtaining a surface shape characteristic can also be applied to the implementation of the embodiment of the present application.

In an example embodiment, the at least one surface reflection characteristic may also comprise:

a reflected light intensity correlation coefficient.

In an example embodiment, the reflected light intensity correlation coefficient, for example, may comprise at least one of: a diffuse reflection coefficient, a specular reflection coefficient, and a reflection index.

The diffuse reflection coefficient and the specular reflection coefficient are parameters related to a material of the object; the reflection index is a parameter related to smoothness of a surface of the photographed side.

With regard to incident light of a given light source on the surface of the photographed side, the diffuse reflection coefficient, specular reflection coefficient, and reflection index may all affect the reflected light intensity of the surface of the photographed side of the object.

For example, in an example embodiment, the reflected light intensity I obtained by means of a Phong illumination model and related to the incident light of the light source may be represented as:

$$I = K_d I_l \cos(\theta) + K_s I_l \cos^n(\alpha)$$

wherein $K_d$ represents a diffuse reflection coefficient, $K_s$ represents a specular reflection coefficient, $I_l$ represents intensity of incident light from a light source, $\theta$ represents an included angle between the incident light and a normal line of a surface of an object, $\alpha$ represents an included angle between reflected light and a photography optical axis, and n represents a reflection index.

In a possible embodiment, the reflected light intensity correlation coefficient can be obtained by user input.

In another example embodiment, an obtained image comprising the photographed side of the object may be analyzed to identify an object of a known reflected light intensity correlation coefficient, and then the reflected light intensity correlation coefficient may be obtained according to the identified object. For example, in an example embodiment, if a reflected light intensity correlation coefficient of a human face is known. and in a photographing field of view, the object is a human face, an image comprising the human face is analyzed to identify that the photographed object is a human face, and a corresponding reflected light intensity correlation coefficient can be further obtained.

In another example embodiment, in a scenario where the reflected light intensity correlation coefficient of the photographed side of the object is unknown, after the above-mentioned surface shape characteristic of the photographed side and first relative direction information and second relative direction information mentioned below are obtained, the object may be pre-flashed by the illumination array with incident light having set intensity and a set angle for one or more times, and the reflected light intensity correlation coefficient of the photographed side can be obtained by means of calculation.

S120. Obtain first relative direction information of the object relative to a photography position related to the photographing field of view.

In an example embodiment, as stated above, in a case in which the depth map is obtained, the step S120 may comprise:

determining, according to the depth map, first relative position information of the photographed side of the object relative to an obtaining position of the depth map.

determining, according to the first relative position information and second relative position information between the obtaining position and the photography position, the first relative direction information.

In the present example embodiment, the first relative position information may be obtained according to depth information of the photographed side of the object in the depth map, and a position of the object in the depth map.

The first relative direction information may be determined by means of a geometrical operation according to the first relative position information and the second relative position information.

Generally speaking, second relative position information between the obtaining position of the depth map and the photography position is known, for example, in an example embodiment, a depth sensor obtaining the depth map and an image sensor photographing the object are arranged on a same user equipment, for example, a camera is provided with an infrared depth sensor, and a position between them is fixed. Even, in an example embodiment, with regard to the object, the two may be considered to be located at the same position, that is the second relative position information is 0.

In another example embodiment, in a scenario where the image corresponding to the photographing field of view is obtained, the first relative direction information may also be determined according to a position of an image area corresponding to the photographed side in the image.

Persons skilled in the art can certainly know that other manner(s) for detecting a direction of an object relative to another object may also be applied to the implementation of the embodiment of the present application, for example, the first relative direction information may be obtained by other position sensor(s) or a positioning apparatus.

S130. Obtain second relative direction information of the object relative to an illumination array, wherein the illumination array comprises multiple illumination units, configured to perform illumination compensation for the photographed side.

In an example embodiment, the second relative direction information is, for example, direction information of the illumination array serving as a whole relative to the object, in particular, when a size of the illumination array, as compared with a distance from the object to the illumination array, can be neglected; in another example embodiment, the second relative direction information may, for example, further comprise direction information from each illumination unit in the illumination array to the object.

In an example embodiment, at least one illumination parameter of each of the multiple illumination units in the illumination array is independently adjustable. Here, the at least one illumination parameter of an illumination unit may, for example, comprise at least one of the following:

a switch control parameter, an optical axis direction, a beam angle, light intensity, and light intensity distribution.

The switch control parameter is a parameter capable of controlling switch-on or switch-off of the illumination unit.

For example, in an example embodiment, the switch control parameter and an optical axis direction of each illumination unit in the illumination array are adjustable.

In an example embodiment, after the first relative position information is obtained according to the above-mentioned depth map, the step S130 may comprise:

determining, according to the first relative position information and third relative position information between the obtaining position and the illumination array, the second relative direction information.

Similar, the third relative position information between the obtaining position and the illumination array is generally also known, for example, both of the depth sensor and the illumination array are arranged on a camera device, and a third relative position between the two is fixed and known; even, in an example embodiment, third relative position information between the two can also be considered to be 0.

The second relative direction information may be determined by means of a geometrical operation according to the first relative position information and the third relative position information.

In an example embodiment, for example, in the above-mentioned scenario where the first relative direction information is determined by means of the image of the photographing field of view, if a relative position of the illumination array to the photography position can be neglected, that is, when the two can be considered to be located at the same position, the second relative direction information equals the first relative direction information.

Persons skilled in the art can certainly know that other manner(s) for detecting a direction of an object relative to another object may also be applied to obtaining the second relative direction information in the implementation of the embodiment of the present application, for example, the second relative direction information may be obtained by other position sensor(s) or a positioning apparatus.

S140. Adjust, at least according to the at least one surface reflection characteristic, the first relative direction information, the second relative direction information, and at least one set illumination compensation criterion, at least one illumination parameter of at least one illumination unit in the illumination array.

In an example embodiment, the at least one set illumination compensation criterion is a natural diffuse reflection illumination compensation criterion. When the illumination compensation provided by the illumination array satisfies the natural diffuse reflection illumination compensation criterion, an image obtained by the image sensor has a natural diffuse reflection illumination effect.

Person skilled in the art can certainly know that, according to a requirement of a photography effect of a user, the illumination compensation criterion can be set according to the requirement. For example, in an example embodiment, the illumination compensation criterion may be a front-light illumination compensation criterion, a side-light illumination compensation criterion, or a Rembrandt-light illumination compensation criterion of different required parameters to cause that the obtained image has a corresponding front-light, side-light, or Rembrandt-light illumination effect; alternatively, in another example embodiment, the illumination compensation criterion may, for example, be that the light intensity of light from any area of the photographed side to the photography position does not exceed a set range, that is, the obtained image is not overexposed.

In an example embodiment, the illumination compensation criterion is determined according to an instruction corresponding to an operation of user, and the operation of the user may, for example, comprise: directly inputting a corresponding illumination compensation criterion by a user or selecting an illumination compensation criterion from multiple illumination compensation criteria by a user; in another example embodiment, the illumination compensation criterion may also be set by default.

In an example embodiment, an included angle α between reflected light from any point A of a surface of the photographed side of the object to the photography position and a photography optical axis corresponding to the photography position can be obtained according to the first relative direction information and the surface shape characteristic of the photographed side of the object, reflected light intensity $I_{total}$ required by the point A can be determined according to the illumination compensation criterion, and when an illumination scope of N illumination units covers the point A, the reflected light intensity $I_{total}$ is a sum of corresponding reflected light intensities $I_1, I_2, \ldots I_n$ of N illumination units at the point A, that is, $I_{total}=I_1+I_2+ \ldots +I_n$, wherein the reflected light intensity $I_i$ generated at the point in correspondence with the ith illumination unit in the N illumination units is:

$$I_i = K_d I_{li} \cos(\theta_i) + K_s I_{li} \cos^n(\alpha)$$

wherein $I_{li}$ is incident light intensity of the ith illumination unit at the point A; $\theta_i$ is an included angle between incident light of the ith illumination unit at the point A and a normal line at the point A.

The incident light intensity $I_{li}$ of the ith illumination unit at the point A is a function related to an optical axis direction, a beam angle, light intensity, and light intensity distribution of emergent light of the ith illumination unit and a distance from the illumination unit to the point A. In an example embodiment, for example, only an optical axis direction of the ith illumination unit is adjustable, and distance differences between different points on the photographed side of the object to the ith illumination unit can be represented by the surface shape characteristic of the photographed side. At this time, the incident light intensity $I_{li}$ can be represented by one function $f(\gamma, d_s)$, wherein $\gamma$ represents an included angle between a light ray of incident light of the ith illumination unit at the point A and an optical axis direction of the ith illumination unit, and $d_s$ represents a distance difference from the point A to a corresponding reference position of the photographed side caused by the surface shape characteristic of the photographed side (for each point on the surface of the photographed side, influence related to the distance from the illumination array to the reference position is the same, and the influence of the distance may be not considered in the present example embodiment).

Because the surface shape characteristic has been obtained in step S110, the reflected light intensity $I_{total}$ required by the point A is also known, and a value of $I_{total}$ is only related to the optical axis directions of the N illumination units. Thus, one or more combinations of the optical axis directions of the N illumination units can be obtained by referring to an adjustment range of the optical axis directions of the N illumination units. Further, one or more preferable combinations of the optical axis directions of the N illumination units can be finally determined according to light intensity of other point(s) influenced by the N illumination units on the photographed side of the object.

In this way, under the natural diffuse reflection illumination compensation criterion, for example, when differences between light intensities respectively related to all the points of the photographed side acquired at the photography position need to be falling within a certain range, in a case in which all the points have the same diffuse reflection coefficient, specular reflection coefficient, and reflection index, the differences between the light intensities are influenced by incident light intensity of the each point corresponding to each reflected light ray corresponding to the multiple illumination unit, an angle between each reflected light ray of the each point and a photography optical axis, and a distance difference from each point to the photography position (for each point on the surface of the photographed side, influence related to a distance from the photography position to the foregoing reference position is the same, and the influence of the distance can be not considered in the present example embodiment). The included angle between each reflected light ray of the each point and the photography optical axis is related to each incident light indirection of each point corresponding to the multiple illumination units, a surface shape characteristic corresponding to each point, and the second relative direction information; distance differences of all the points to the photography position are related to the surface shape characteristic of the photographed side.

Therefore, it could be known that at least one illumination parameter of at least one illumination unit in the illumination array can be determined and adjusted according to the at least one surface reflection characteristic, the first relative direction information, the second relative direction information, and a set illumination compensation criterion to cause that the object photographed at the photography position has an illumination effect corresponding to the illumination compensation criterion.

In an example embodiment, in order to simplify calculation for obtaining the at least one illumination parameter, the step S140 may be:

determining, according to the surface shape characteristic of the photographed side of the object, multiple surface areas of the photographed side of the object; and for each surface area in the multiple surface areas:

determining, according to the surface shape characteristic of the photographed side of the object, an area surface reflection characteristic of each surface area; and determining, according to the area surface shape characteristic of the each surface area, the first relative direction information, the second relative direction information, and the at least one set illumination compensation criterion, at least one illumination unit in the illumination array corresponding to the each surface area and at least one illumination parameter of the at least one illumination unit corresponding to the each surface area.

In the present example embodiment, because shape characteristics corresponding to respective points in the same surface area can be considered to be the same, it is unnecessary to perform calculation for each point on the photographed side to obtain the at least one illumination parameter, and instead, a surface area is taken as a whole for calculation and a calculation process is simplified.

In an example embodiment, in order to facilitate calculation or make a calculation result more accurate, the method further comprises:

obtaining first relative distance information of the photographed side of the object to the photography position; and obtaining second relative distance information of the photographed side of the object to the illumination array.

In an example embodiment, the first relative distance information may be obtained according to the first relative position information and the second relative position information.

In an example embodiment, the second relative distance information may be obtained according to the first relative position information and the third relative position information.

Persons skilled in the art can certainly know that the first relative distance information and the second relative distance information can also be obtained in another possible manner, for example, a position sensor, a positioning apparatus, or the like.

In the present example embodiment, the step S140 may be:

adjusting, at least according to the at least one surface reflection characteristic, the first relative direction information, the second relative direction information, the first relative distance information, the second relative distance information, and the at least one set illumination compensation criterion, the at least one illumination parameter of the at least one illumination unit in the illumination array.

A method for adjusting the at least one illumination parameter of the at least one illumination unit in the present example embodiment is similar to the foregoing implementation where the first relative distance information and the second relative distance information are not referred to and is not repeatedly described herein.

An example embodiment of the present application is further described by using the application scenario below.

Figure 2A:
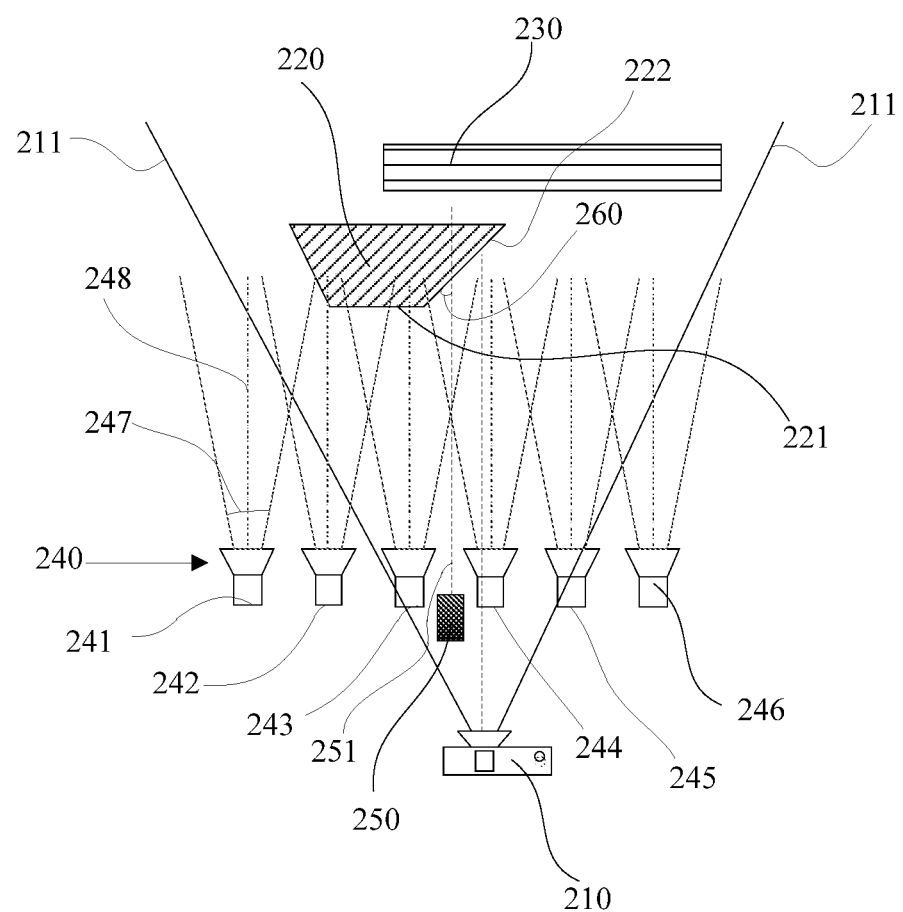
FIG. 2a and FIG. 2b are schematic diagrams of an application scenario of a photography illumination compensation method according to an example embodiment of the present application.

As shown in FIG. 2a, in a scenario:

A photographing field of view 211 corresponding to an image sensor 210 has a first object 220 serving as a foreground and a second object 230 serving as a background.

An illumination array 240 comprises multiple illumination units 241 to 246, wherein beam angles 247, emergent light intensity, and light intensity distribution of the multiple illumination units 241 to 246 are known.

A depth sensor 250 is configured to perform depth detection on a scenario corresponding to the photographing field of view 211 to obtain a depth map corresponding to the photographing field of view 211, wherein second relative position information of the depth sensor 250 relative to the image sensor 210 is known; third relative position information of the depth sensor 250 relative to each of the illumination units 241 to 246 in the illumination array 240 is known.

In the present example embodiment, adjusting at least one illumination parameter of an illumination unit according to at least one surface reflection characteristic of the first object 220 is used as an example for description, wherein a photographed side of the first object 220 comprises a first surface area 221 and a second surface area 222.

In the present example embodiment, the first relative position information of the photographed side of the first object 220 relative to the depth sensor 250 and the surface shape characteristic of the photographed side of the first object 220 can be obtained according to the depth map. The surface shape characteristic, for example, comprises information of a depth difference between the first surface area 221 and the second surface area 222 relative to the depth sensor 250, the first surface area 221 is a plane perpendicular to a depth obtaining direction 251 of the depth sensor 250, the second surface area 221 is a plane, and there is a first angle 260 between the second surface area 221 and the depth obtaining direction 251.

First relative direction information and first relative distance information of the photographed side relative to the image sensor 210 and second relative direction information and second relative distance information of the photographed side relative to each of the illumination units 241 to 246 can be obtained according to the first relative position information, second relative position information, and third relative position information.

In the present example embodiment, the first surface area 221 and the second surface area 222 comprised by the photographed side are determined according to the surface shape characteristic of the photographed side.

It is determined according to a photography effect that needs to be achieved that the illumination compensation criterion of the present example embodiment is a natural diffuse reflection illumination compensation criterion.

The illumination unit 242 corresponding to the first surface area 221 and the illumination unit 244 corresponding to the second surface area 222, and optical axis directions 248 of the two illumination units 242 and 244 are determined according to the method of the implementation of the foregoing step S140. Moreover, the illumination unit 241 and illumination unit 243 are switched off in the application scenario of the present example embodiment.

Persons skilled in the art can certainly know that in some possible implementations, the method of the embodiment of the present application may comprise adjusting the illumination parameter of the illumination unit according to multiple objects in the photographing field of view. For example, in the implementation shown in FIG. 2a and FIG. 2b, two illumination units 245 and 246 corresponding to the photographed side of the second object 230 and optical axis directions 248 and light intensity distribution of the two illumination units 245 and 246 can also be determined.

It should be understood that in various embodiments of the present application, the value of the serial number of each step described above does not mean an execution sequence, and the execution sequence of each step should be determined according to the function and internal logic thereof, and should not be any limitation on the implementation procedure of the embodiments of the present application.

Figure 3:
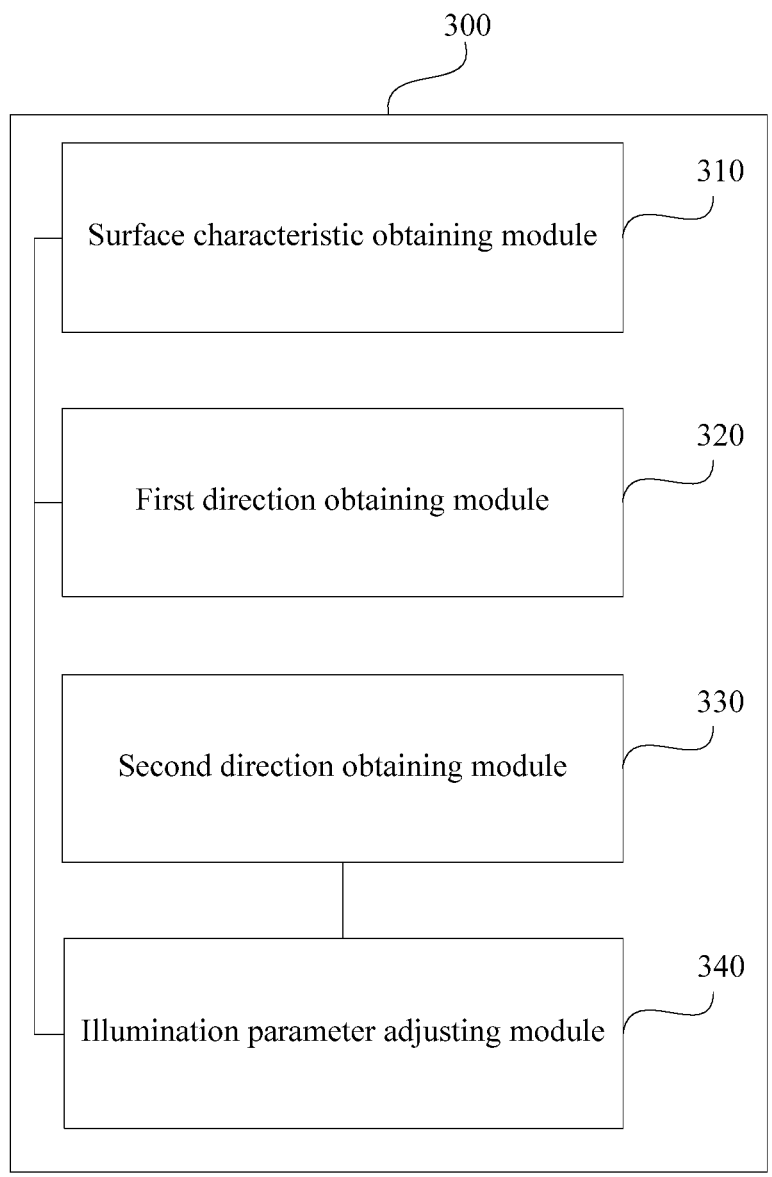
FIG. 3 is a structural schematic block diagram of a photography illumination compensation apparatus according to an example embodiment of the present application.

As shown in FIG. 3, an example embodiment of the present application provides a photography illumination compensation apparatus 300, comprising:
  a surface characteristic obtaining module 310, configured to obtain at least one surface reflection characteristic of a photographed side of an object in a photographing field of view, wherein the at least one surface reflection characteristic comprises a surface shape characteristic;
  a first direction obtaining module 320, configured to obtain first relative direction information of the object relative to a photography position related to the photographing field of view;
  a second direction obtaining module 330, configured to obtain second relative direction information of the object relative to an illumination array, wherein the illumination array comprises multiple illumination units, configured to perform illumination compensation for the photographed side; and
  an illumination parameter adjusting module 340, configured to adjust, at least according to the at least one surface reflection characteristic, the first relative direction information, the second relative direction information, and at least one set illumination compensation criterion, at least one illumination parameter of at least one illumination unit in the illumination array.

In implementations of embodiments of the present application, when an illumination array comprising multiple illumination units performs illumination compensation for a photographed object in a photographing field of view, at least one illumination parameter of at least one illumination unit in the illumination array is determined by referring to a surface shape characteristic of the photographed object in the photographing field of view, so as to perform better illumination compensation for the photographed object in the photographing field of view to cause that an obtained image achieves a required illumination compensation effect.

Respective modules of the embodiment of the present application are further described by using the implementations below.

In the embodiment of the present application, the surface shape characteristic of the photographed side of the object, on one hand, affects a normal line direction of each point on a surface of the photographed side, and on the other hand, also affects relative distances from the each point to the photography position and the illumination array. Wherein, when compared with the relative distances from the photographed side of the object to the photography position and the illumination array, distance differences between each point to the photography position and each point to the illumination array caused by the surface shape characteristic of the photographed side can be neglected, the surface shape characteristic can be considered to only affect the normal line direction.

Figure 4A:
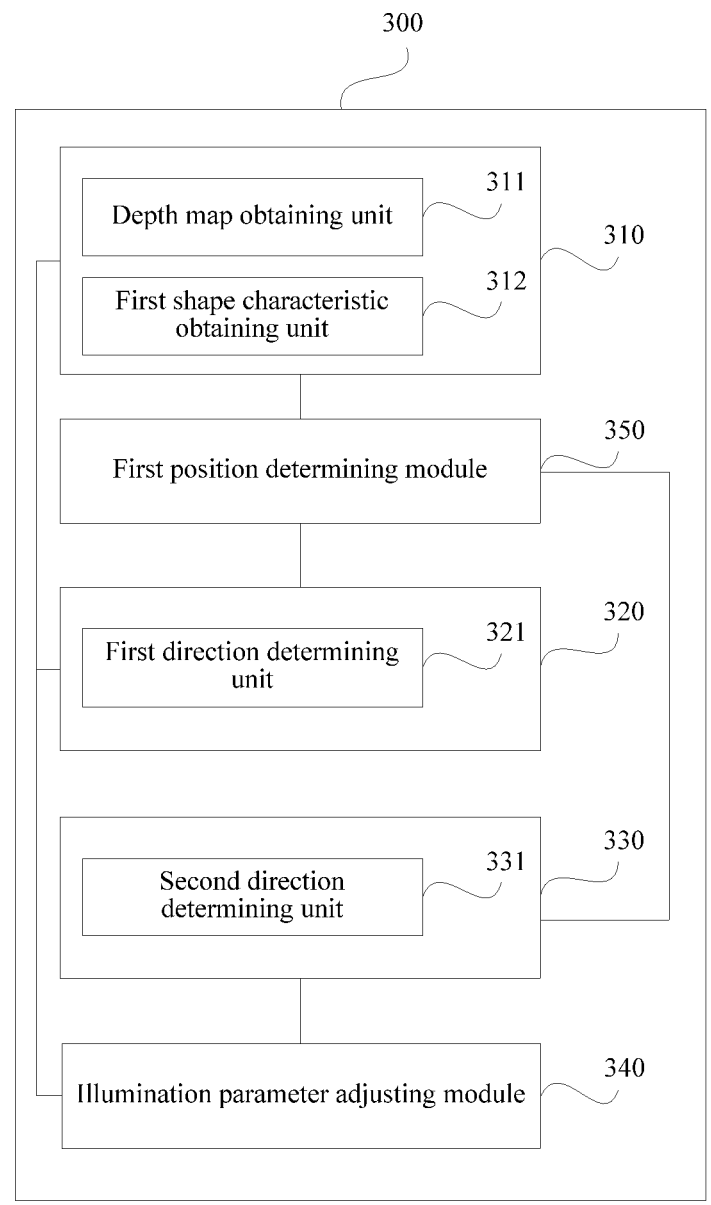
FIG. 4a, FIG. 4c, and FIG. 4d are respectively structural schematic block diagrams of three photography illumination compensation apparatus according to an example embodiment of the present application.

As shown in FIG. 4a, in an example embodiment, the surface characteristic obtaining module 210 comprises:
  a depth map obtaining unit 311, configured to obtain a depth map of the photographed side of the object; and
  a first shape characteristic obtaining unit 312, configured to analyze the depth map to obtain the surface shape characteristic of the photographed side of the object.

Because the depth map comprises information of a distance from each point of the photographed side of the object to an obtaining position of the depth map, the surface shape characteristic can be obtained by analyzing the depth map.

In an example embodiment, the apparatus 300 further comprises:
  a first position determining module 350, configured to determine, according to the depth map, first relative position information of the photographed side of the object relative to an obtaining position of the depth map.

In an example embodiment, the first direction obtaining module 320 comprises:
  a first direction determining unit 321, configured to determine, according to the first relative position information and second relative position information between the obtaining position and the photography position, the first relative direction information.

In an example embodiment, the second direction obtaining module 330 comprises:
  a second direction determining unit 331, configured to determine, according to the first relative position information and third relative position information between the obtaining position and the illumination array, the second relative direction information.

Reference may be made to corresponding descriptions in the embodiments of the method shown in FIG. 1 for further descriptions on the first position determining module 350, the first direction determining unit 321, and the second direction determining unit 331.

In an example embodiment, the illumination parameter adjusting module 340 is further configured to adjust at least one of the following illumination parameters of the illumination unit:
  a switch control parameter, an optical axis direction, a beam angle, light intensity, and light intensity distribution.

Figure 2B:
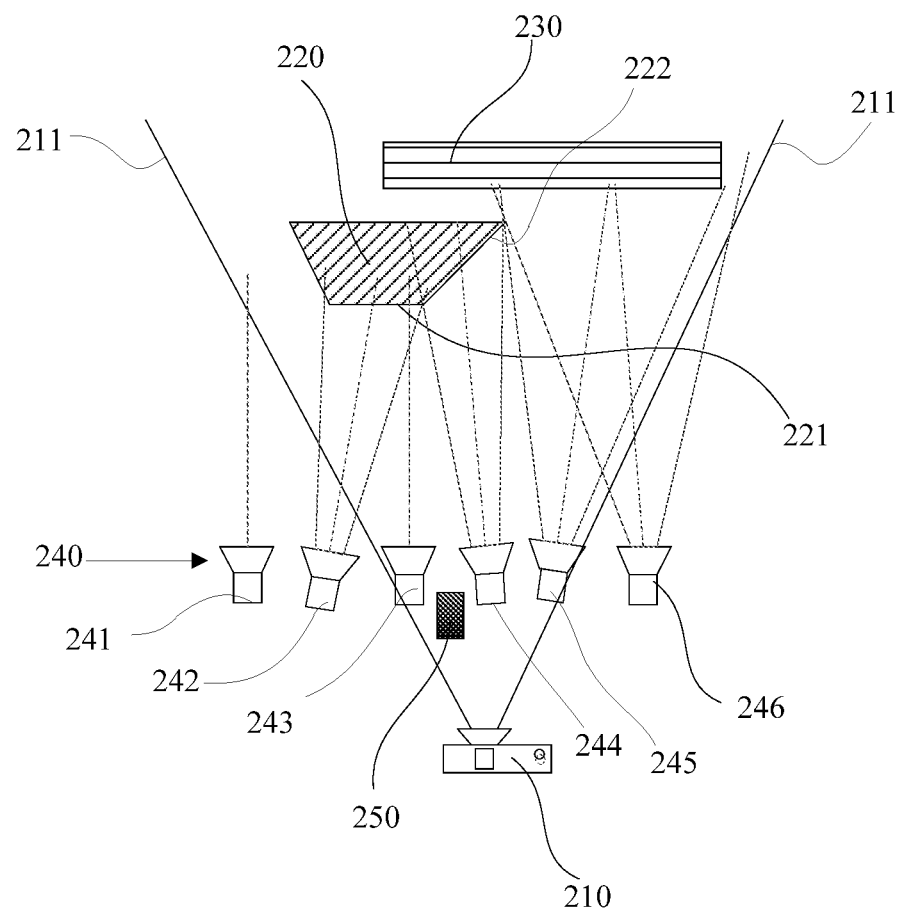

For example, in the implementation shown in FIG. 2a and FIG. 2b, the illumination parameter adjusting module 340 can be configured to adjust the switch control parameter and an optical axis direction of the corresponding illumination unit.

Reference may be made to the corresponding description in the embodiments of the method shown in FIG. 1 for details.

In an example embodiment, the at least one set illumination compensation criterion is a natural diffuse reflection illumination compensation criterion. When the illumination compensation provided by the illumination array satisfies the natural diffuse reflection illumination compensation criterion, an image obtained by the image sensor has a natural diffuse reflection illumination effect.

Person skilled in the art can certainly know that, according to a requirement of a photography effect of a user, the illumination compensation criterion can be set according to the requirement.

In an example embodiment manner, the illumination compensation criterion is determined according to an instruction corresponding to an operation of user, and the operation of the user may, for example, comprise: directly inputting a corresponding illumination compensation criterion by a user or selecting an illumination compensation criterion from multiple illumination compensation criteria by a user; in another example embodiment, the illumination compensation criterion may also be set by default.

Reference may be made to the corresponding description in the embodiments of the method shown in FIG. 1 for specific implementation of adjusting, by the illumination parameter adjusting module 340, at least one illumination parameter of at least one illumination unit in the illumination array according to the foregoing parameter.

Figure 4B:
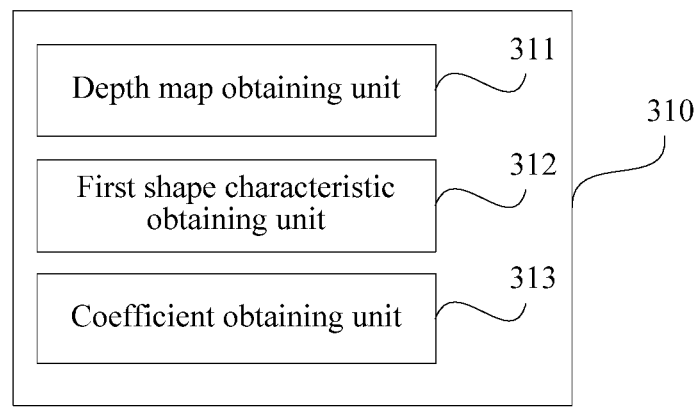
FIG. 4b is a structural schematic block diagram of a surface characteristic obtaining module of a photography illumination compensation apparatus according to an example embodiment of the present application.

As shown in FIG. 4b, in an example embodiment, structures and functions of other modules and units of the photography illumination compensation apparatus 300 are the same as those in the implementation shown in FIG. 4a, and the differences are that:

The at least one surface reflection characteristic of the photographed side of the object further comprises a reflected light intensity correlation coefficient of a surface of the photographed side; and the surface characteristic obtaining module 310 further comprises:
a coefficient obtaining unit 313, configured to obtain the reflected light intensity correlation coefficient of the surface of the photographed side.

In the present example embodiment, when determining the at least one illumination unit and its corresponding at least one illumination parameter, the illumination parameter adjusting module 340 also needs to perform determination with reference to the reflected light intensity correlation coefficient obtained by the coefficient obtaining unit 313. An effect of adjusting the illumination compensation is better.

In an example embodiment, the reflected light intensity correlation coefficient, for example, may comprise: a diffuse reflection coefficient, a specular reflection coefficient, and a reflection index.

In a possible embodiment, the reflected light intensity correlation coefficient may be obtained by user input.

In another example embodiment, an obtained image comprising the photographed side of the object may be analyzed to identify a known object of the reflected light intensity correlation coefficient, and then the reflected light intensity correlation coefficient may be obtained according to the identified object.

In another example embodiment, in a scenario where the reflected light intensity correlation coefficient of the photographed side of the object is unknown, after the above-mentioned surface shape characteristic of the photographed side and the first relative direction information and second relative direction information are obtained, the object may be pre-flashed by the illumination array with incident light having set intensity and a set angle for one or more times, and the reflected light intensity correlation coefficient of the photographed side can be obtained by means of calculation.

Reference may be made to the corresponding description in the embodiments of the method shown in FIG. 1 for details, and no repeated description is provided herein.

Figure 4C:
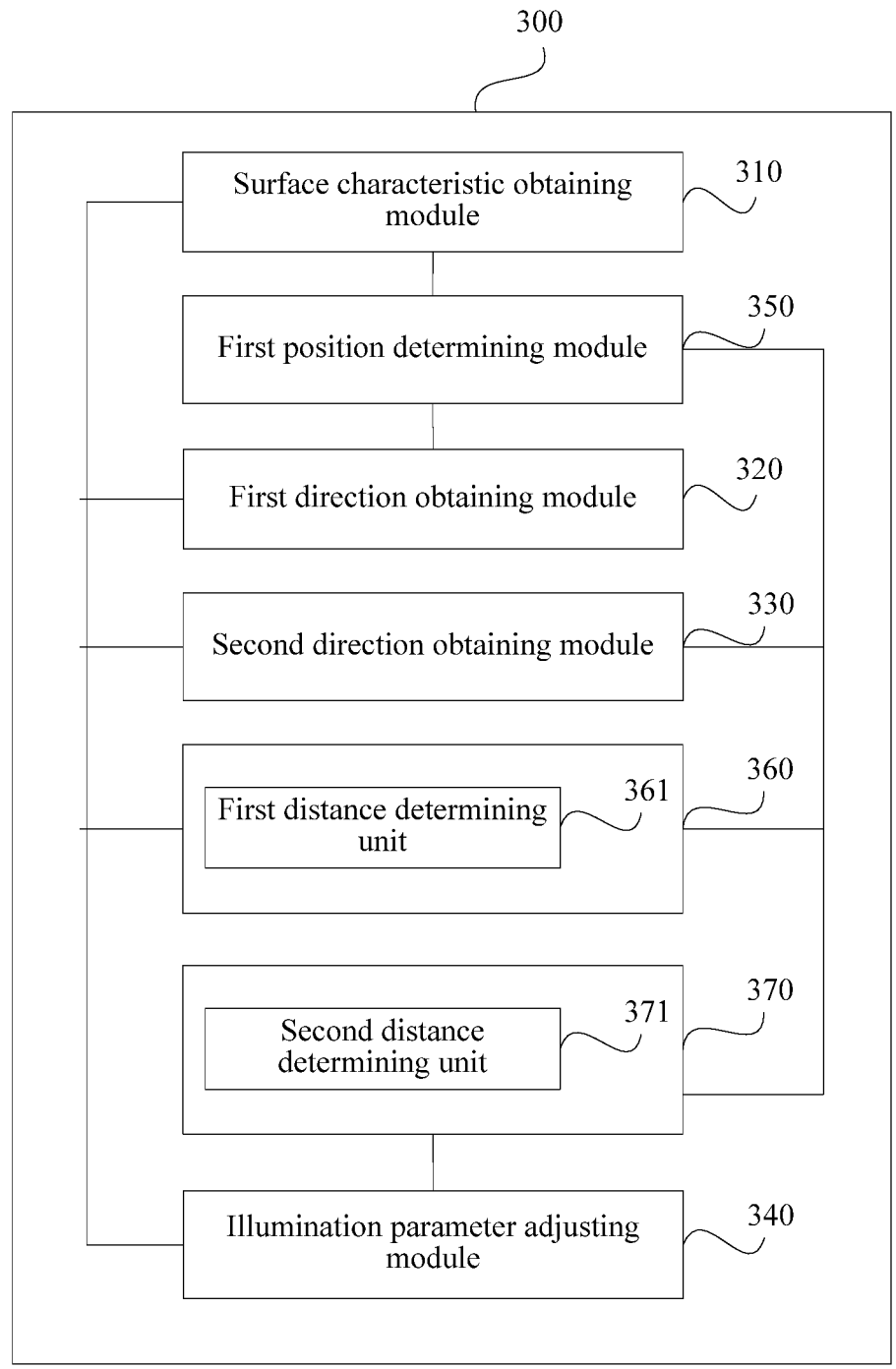

As shown in FIG. 4c, in an example embodiment, the photography illumination compensation apparatus 300 is similar to the implementation shown in FIG. 4a or FIG. 4b, and the difference is that the apparatus 300 further comprises:
a first distance obtaining module 360, configured to obtain first relative distance information of the photographed side of the object to the photography position; and
a second distance obtaining module 370, configured to obtain second relative distance information of the photographed side of the object to the illumination array; and
the illumination parameter adjusting module 340 is further configured to:
adjust, at least according to the at least one surface reflection characteristic, the first relative direction information, the second relative direction information, the first relative distance information, the second relative distance information, and the at least one set illumination compensation criterion, the at least one illumination parameter of the at least one illumination unit in the illumination array.

In an example embodiment, the first distance obtaining module 360 comprises:
a first distance determining unit 361, configured to determine, according to the first relative position information and second relative position information between the obtaining position and the photography position, the first relative distance information.

In an example embodiment, the second distance obtaining module 370 comprises:
a second distance determining unit 371, configured to determine, according to the first relative position information and third relative position information between the obtaining position and the illumination array, the second relative direction information.

Figure 4D:
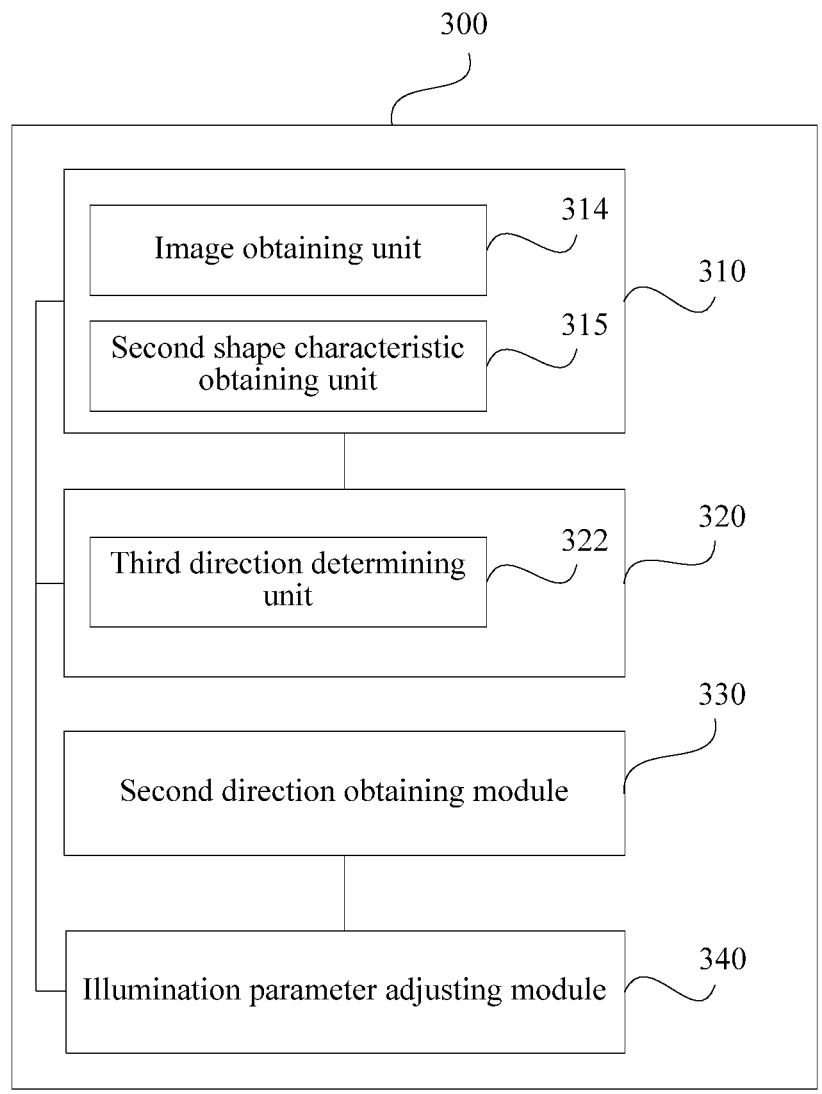

As shown in FIG. 4d, in an example embodiment, the photography illumination compensation apparatus 300 is similar to the implementation shown in FIG. 3 and also comprises the surface characteristic obtaining module 310, the first direction obtaining module 320, the second direction obtaining module 330, and the illumination parameter adjusting module 340.

The surface characteristic obtaining module 310 comprises:
an image obtaining unit 314, configured to obtain an image corresponding to the photographing field of view; and
a second shape characteristic obtaining unit 315, configured to analyze the image to obtain the surface shape characteristic of the photographed side of the object.

With regard to a surface shape characteristic of some object having a regular surface, for example, an object having a spherical surface, an object having a rectangular surface, and the like, an image characteristic of the object may be obtained by analyzing the image, so as to obtain the surface shape characteristic of the photographed side of the object.

Persons skilled in the art can certainly know that other method(s) for obtaining a surface shape characteristic can also be applied to the implementation of the embodiment of the present application.

In an example embodiment, the first direction obtaining module 320 comprises:

a third direction determining unit 322, configured to determine, according to a position of an image area corresponding to the photographed side in the image, the first relative direction information.

In the present example embodiment, for example, the relative distance between the illumination array and the photography position of the image is very small to cause that the relative distance and the distance from the illumination array to the object can be neglected, and at this time, the second relative direction information is the same as the first relative direction information.

Therefore, the second direction obtaining module 330 is further configured to obtain the first relative direction information as the second relative direction information.

As compared with the implementations shown in FIG. 4a to FIG. 4c, in the present example embodiment, it is unnecessary to use an apparatus, such as a depth sensor, to obtain a corresponding depth map, and instead, each parameter is obtained by means of an image photographed by a photographing apparatus.

Reference may be made to the corresponding description in the embodiments of the method shown in FIG. 1 for implementation of respective modules and units of the apparatus of the present example embodiment.

Figure 4E:
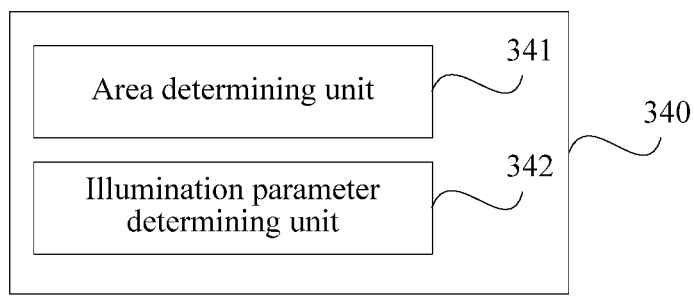
FIG. 4e is a structural schematic block diagram of at least one illumination parameter adjusting module of a photography illumination compensation apparatus according to an example embodiment of the present application.

As shown in FIG. 4e, in an example embodiment, the surface characteristic obtaining module 310, the first direction obtaining module 320, the second direction obtaining module 330, and the illumination parameter adjusting module 330 of the photography illumination compensation apparatus 300 may be the same as any implementation in FIG. 4a to FIG. 4c, and the differences are that:

The illumination parameter adjusting module 340 comprises:

an area determining unit 341, configured to determine, according to the surface shape characteristic of the photographed side of the object, multiple surface areas of the photographed side of the object;

an illumination parameter determining unit 342, configured to, for each surface area in the multiple surface areas:

determine, according to the surface shape characteristic of the photographed side of the object, an area surface reflection characteristic of each surface area; and determine, according to the area surface shape characteristic of the each surface area, the first relative direction information, the second relative direction information, and the at least one set illumination compensation criterion, at least one illumination unit in the illumination array corresponding to the each surface area and at least one illumination parameter of the at least one illumination unit corresponding to the each surface area.

Reference may be made to the corresponding description in the embodiments of the method shown in FIG. 1 and FIG. 2 for implementation of functions of respective modules and units of the apparatus of the present example embodiment.

In the present example embodiment, because shape characteristics corresponding to respective points in the same surface area can be considered to be the same, it is unnecessary to perform calculation for each point on the photographed side to obtain the at least one illumination parameter, and instead, a surface area is taken as a whole for calculation and a calculation process is simplified.

Figure 5:
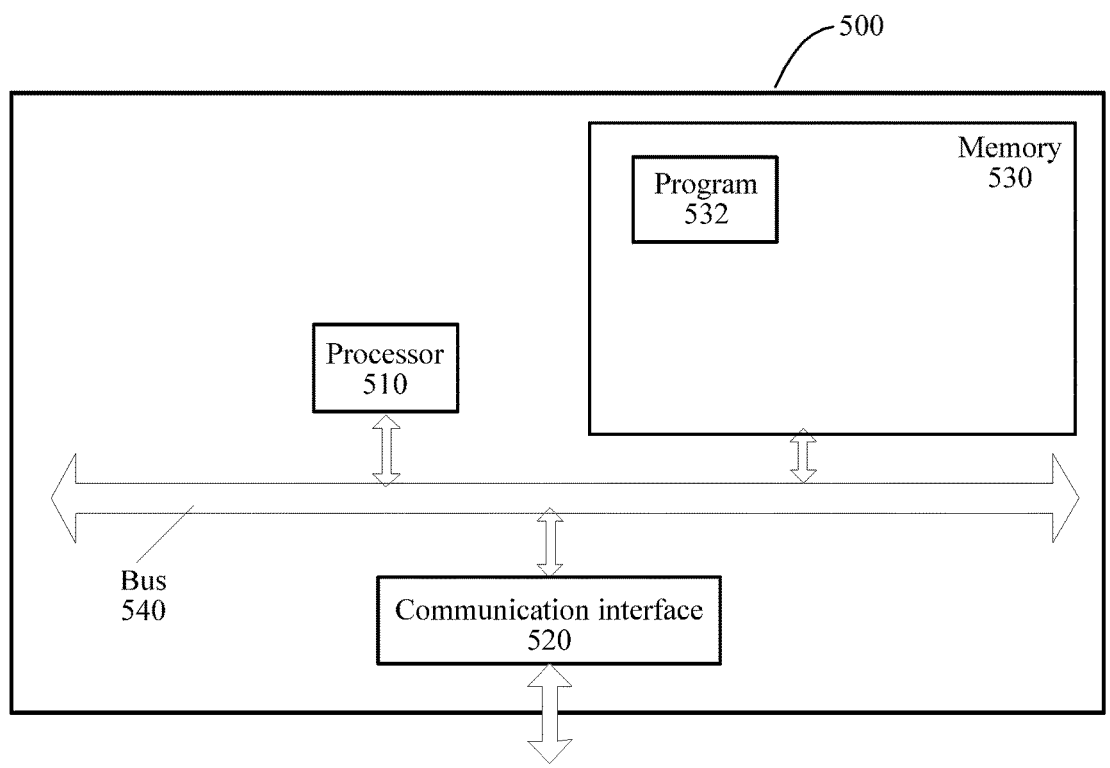
FIG. 5 is a structural schematic block diagram of a photography illumination compensation apparatus according to an example embodiment of the present application.

FIG. 5 is a structural schematic block diagram of another photography illumination compensation apparatus 500 according to an embodiment of the present application, and the specific embodiment of the present application does not define the specific implementation of the photography illumination compensation apparatus 500. As shown in FIG. 5, the photography illumination compensation apparatus 500 may comprise:

a processor 510, a communication interface 520, a memory 530, and a communications bus 540.

The processor 510, the communication interface 520, and the memory 530 communicate with each other by using the communications bus 540.

The communication interface 520 is configured to communicate with a network element such as a client.

The processor 510 is configured to execute a program 532 and specifically can perform relevant steps in the foregoing method embodiment.

Specifically, the program 532 may comprise program code, where the program code comprises a computer operation instruction.

The processor 510 may be a central processing unit (CPU), an application specific integrated circuit (ASIC), or one or more integrated circuits configured to implement the embodiments of the present application.

The memory 530 is configured to store the program 532. The memory 530 may comprise a high-speed random access memory (RAM) memory, and may also comprise a non-volatile memory such as at least one magnetic disk storage. The program 532 can be specifically used to cause the photography illumination compensation apparatus 500 to perform the following steps:

obtaining at least one surface reflection characteristic of a photographed side of an object in a photographing field of view, wherein the at least one surface reflection characteristic comprises a surface shape characteristic;

obtaining first relative direction information of the object relative to a photography position related to the photographing field of view;

obtaining second relative direction information of the object relative to an illumination array, wherein the illumination array comprises multiple illumination units, configured to perform illumination compensation for the photographed side; and adjusting, at least according to the at least one surface reflection characteristic, the first relative direction information, the second relative direction information, and at least one set illumination compensation criterion, at least one illumination parameter of at least one illumination unit in the illumination array.

For the specific implementation of the steps in the program 532, refer to the corresponding descriptions of corresponding steps and units in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Figure 6:
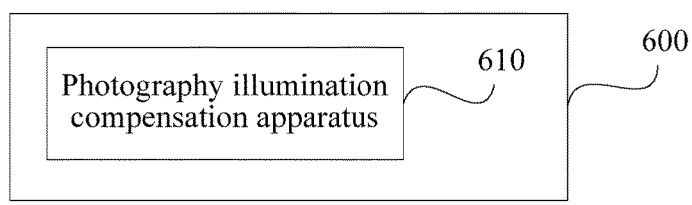
FIG. 6 is a schematic structural block diagram of a user equipment according to an example embodiment of the present application.

As shown in FIG. 6, an example embodiment of the present application provides a user equipment 600, and the user equipment 600 may comprise the foregoing photography illumination compensation apparatus 610.

In an example embodiment, the user equipment 600 may also comprise the foregoing image sensor and illumination array.

In an example embodiment, the user equipment 600 may also comprise the foregoing depth sensor.

In the present example embodiment, when an illumination array comprising multiple illumination units performs illumination compensation for a photographed object in a photographing field of view, at least one illumination parameter of at least one illumination unit in the illumination array is determined by referring to a surface shape characteristic of the photographed object in the photographing field of view, so as to perform better illumination compensation for the photographed object in the photographing field of view to cause that an obtained image achieves a required illumination compensation effect.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a server, or a network device) or a processor to perform all or a part of the steps of the methods in the embodiments of the present application. The foregoing storage medium comprises: any medium that can store program code, such as a USB flash drive, a removable hard disk, a read-only memory (ROM), a random access memory (RAM), a magnetic disk, or an optical disc.

The above implementations are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A method, comprising:
    obtaining, by a system comprising a processor, at least one surface reflection characteristic of a photographed side of an object in a photographing field of view, wherein the at least one surface reflection characteristic comprises a surface shape characteristic;
    obtaining first relative direction information of the object relative to a photography position related to the photographing field of view;
    obtaining second relative direction information of the object relative to an illumination array, wherein the illumination array comprises multiple illumination units configured to perform illumination compensation for the photographed side; and
    adjusting, at least according to the at least one surface reflection characteristic, the first relative direction information, the second relative direction information, and at least one set illumination compensation criterion, at least one illumination parameter of at least one illumination unit in the illumination array.

2. The method of claim 1, further comprising:
    obtaining first relative distance information of the photographed side of the object to the photography position; and
    obtaining second relative distance information of the photographed side of the object to the illumination array,
    wherein the adjusting the at least one illumination parameter of the at least one illumination unit in the illumination array comprises:
    adjusting, at least according to the at least one surface reflection characteristic, the first relative direction information, the second relative direction information, the first relative distance information, the second relative distance information, and the at least one set illumination compensation criterion, the at least one illumination parameter of the at least one illumination unit in the illumination array.

3. The method of claim 2, wherein the obtaining the surface shape characteristic of the photographed side of the object comprises:
    obtaining a depth map of the photographed side of the object; and
    analyzing the depth map to obtain the surface shape characteristic of the photographed side of the object.

4. The method of claim 3, further comprising:
    determining, according to the depth map, first relative position information of the photographed side of the object relative to an obtaining position of the depth map.

5. The method of claim 4, further comprising:
    determining, according to the first relative position information and second relative position information between the obtaining position and the photography position, the first relative direction information or the first relative distance information.

6. The method of claim 4, further comprising:
    determining, according to the first relative position information and third relative position information between the obtaining position and the illumination array, the second relative direction information and/or the second relative distance information.

7. The method of claim 1, wherein the obtaining the surface shape characteristic of the photographed side of the object comprises:
    obtaining an image corresponding to the photographing field of view; and
    analyzing the image to obtain the surface shape characteristic of the photographed side of the object.

8. The method of claim 7, wherein the obtaining the first relative direction information comprises:
    determining, according to a position of an image area corresponding to the photographed side in the image, the first relative direction information.

9. The method of claim 1, wherein the at least one surface reflection characteristic of the photographed side of the object further comprises:
a reflected light intensity correlation coefficient of a surface of the photographed side.

10. The method of claim 1, wherein the at least one illumination parameter comprises at least one of
a switch control parameter, an optical axis direction, a beam angle, a light intensity, or a light intensity distribution.

11. The method of claim 1, wherein the at least one set illumination compensation criterion comprises at least one of
a natural diffuse reflection illumination compensation criterion, a front-light illumination compensation criterion, a side-light illumination compensation criterion, or a Rembrandt-light illumination compensation criterion.

12. The method according to claim 1, wherein the adjusting the at least one illumination parameter comprises:
determining, according to the surface shape characteristic of the photographed side of the object, multiple surface areas of the photographed side of the object; and
for each surface area in the multiple surface areas:
determining, according to the surface shape characteristic of the photographed side of the object, an area surface reflection characteristic of each surface area; and
determining, according to the area surface shape characteristic of the each surface area, the first relative direction information, the second relative direction information, and the at least one set illumination compensation criterion, at least one illumination unit in the illumination array respectively corresponding to the each surface area and at least one illumination parameter of the at least one illumination unit.

13. An apparatus, comprising:
a memory that stores executable modules; and
a processor, couple to the memory, that executes or facilitates execution of the executable modules, the executable modules comprising:
a surface characteristic obtaining module configured to obtain a surface reflection characteristic of a photographed side of an object in a photographing field of view, wherein the surface reflection characteristic comprises a surface shape characteristic;
a first direction obtaining module configured to obtain first relative direction information of the object relative to a photography position related to the photographing field of view;
a second direction obtaining module configured to obtain second relative direction information of the object relative to an illumination array, wherein the illumination array comprises multiple illumination units configured to perform illumination compensation for the photographed side; and
an illumination parameter adjusting module configured to adjust, at least according to the surface reflection characteristic, the first relative direction information, the second relative direction information, and a set illumination compensation criterion, an illumination parameter of an illumination unit in the illumination array.

14. The apparatus of claim 13, wherein the executable modules further comprise:
a first distance obtaining module configured to obtain first relative distance information of the photographed side of the object to the photography position; and
a second distance obtaining module configured to obtain second relative distance information of the photographed side of the object to the illumination array,
wherein the illumination parameter adjusting module is further configured to:
adjust, at least according to the surface reflection characteristic, the first relative direction information, the second relative direction information, the first relative distance information, the second relative distance information, and the set illumination compensation criterion, the illumination parameter of the illumination unit in the illumination array.

15. The apparatus of claim 14, wherein the surface characteristic obtaining module comprises:
a depth map obtaining unit configured to obtain a depth map of the photographed side of the object; and
a first shape characteristic obtaining unit configured to analyze the depth map to obtain the surface shape characteristic of the photographed side of the object.

16. The apparatus of claim 15, wherein the executable modules further comprise:
a first position determining module according to the depth map, first relative position information of the photographed side of the object relative to an obtaining position of the depth map.

17. The apparatus of claim 16, wherein the first direction obtaining module comprises:
a first direction determining unit configured to determine the first relative direction information according to the first relative position information and second relative position information between the obtaining position and the photography position.

18. The apparatus of claim 16, wherein the first distance obtaining module comprises:
a first distance determining unit configured to determine the first relative distance information according to the first relative position information and second relative position information between the obtaining position and the photography position.

19. The apparatus of claim 16, wherein the second direction obtaining module comprises:
a second direction determining unit configured to determine the second relative direction information according to the first relative position information and third relative position information between the obtaining position and the illumination array.

20. The apparatus of claim 16, wherein the second distance obtaining module comprises:
a second distance determining unit configured to determine the second relative direction information according to the first relative position information and third relative position information between the obtaining position and the illumination array.

21. The apparatus of claim 13, wherein the surface characteristic obtaining module comprises:
an image obtaining unit configured to obtain an image corresponding to the photographing field of view; and
a second shape characteristic obtaining unit configured to analyze the image to obtain the surface shape characteristic of the photographed side of the object.

22. The apparatus of claim 21, wherein the first direction obtaining module comprises:
a third direction determining unit configured to determine, according to a position of an image area corresponding to the photographed side in the image, the first relative direction information.

23. The apparatus of claim 13, wherein the surface reflection characteristic of the photographed side of the object further comprises a reflected light intensity correlation coefficient of a surface of the photographed side, and wherein the surface characteristic obtaining module further comprises:
a coefficient obtaining unit configured to obtain the reflected light intensity correlation coefficient of the surface of the photographed side.

24. The apparatus of claim 13, wherein the illumination parameter comprises at least one of
a switch control parameter, an optical axis direction, a beam angle, a light intensity, or a light intensity distribution.

25. The apparatus of claim 13, wherein the illumination parameter adjusting module comprises:
an area determining unit configured to determine multiple surface areas of the photographed side of the object according to the surface shape characteristic of the photographed side of the object;
an illumination parameter determining unit configured to, for each surface area in the multiple surface areas:
determine, according to the surface shape characteristic of the photographed side of the object, an area surface reflection characteristic of each surface area; and
determine, according to the area surface shape characteristic of the each surface area, the first relative direction information, the second relative direction information, and the set illumination compensation criterion, one or more illumination units in the illumination array respectively corresponding to the each surface area and an illumination parameter of the at least one illumination unit.

26. A user equipment, comprising the apparatus of claim 13.

27. A computer readable storage device comprising executable instructions that, in response to execution, cause a device comprising a processor to perform operations, comprising:
obtaining a surface reflection characteristic of a photographed side of an object in a photographing field of view, wherein the surface reflection characteristic comprises a surface shape characteristic;
obtaining first relative direction information of the object relative to a photography position related to the photographing field of view;
obtaining second relative direction information of the object relative to an illumination array, wherein the illumination array comprises multiple illumination units configured to perform illumination compensation for the photographed side; and
adjusting, at least according to the surface reflection characteristic, the first relative direction information, the second relative direction information, and a set illumination compensation criterion, an illumination parameter of an illumination unit in the illumination array.

* * * * *